US011891344B2

(12) United States Patent
Quan

(10) Patent No.: US 11,891,344 B2
(45) Date of Patent: Feb. 6, 2024

(54) METHODS FOR GRADED UTILIZATION OF FLUORINE AND SILICON RESOURCES IN PHOSPHATE ORES

(71) Applicant: CHTEM LIMITED, Guizhou (CN)

(72) Inventor: Xiaowei Quan, Guiyang (CN)

(73) Assignee: CHTEM LIMITED, Guiyang (CN)

( * ) Notice: Subject to any disclaimer, the term of this patent is extended or adjusted under 35 U.S.C. 154(b) by 0 days.

(21) Appl. No.: 18/296,356

(22) Filed: Apr. 5, 2023

(65) Prior Publication Data

US 2023/0339822 A1 Oct. 26, 2023

Related U.S. Application Data

(63) Continuation of application No. PCT/CN2023/081412, filed on Mar. 14, 2023.

(30) Foreign Application Priority Data

Apr. 20, 2022 (CN) .......................... 202210413670.0

(51) Int. Cl.
 *C05B 11/08* (2006.01)
 *C01B 7/19* (2006.01)
 *C01B 33/107* (2006.01)
(52) U.S. Cl.
 CPC .............. *C05B 11/08* (2013.01); *C01B 7/196* (2013.01); *C01B 33/10705* (2013.01)
(58) Field of Classification Search
 CPC .......... C05B 11/08; C01B 7/19; C01B 33/107
 See application file for complete search history.

(56) References Cited

U.S. PATENT DOCUMENTS

| 4,457,901 | A | 7/1984 | Kitsugi et al. |
| 2009/0274606 | A1 | 11/2009 | Nagano et al. |

FOREIGN PATENT DOCUMENTS

| CN | 101973553 A | 2/2011 |
| CN | 102001666 A | 4/2011 |

(Continued)

OTHER PUBLICATIONS

First Office Action in Chinese Application No. 202210413670.0 dated Nov. 23, 2022, 9 pages.

(Continued)

*Primary Examiner* — Jafar F Parsa
(74) *Attorney, Agent, or Firm* — METIS IP LLC

(57) ABSTRACT

The present disclosure discloses a method for graded utilization of fluorine and silicon resources in a phosphate ore. While the phosphate ore reacts with sulfuric acid, a fluorine-containing and silicon-containing tail gas is produced. $SiO_2$ and $H_2SiF_6$ solution with a high concentration are obtained by concentrating and filtering a solution containing HF and $H_2SiF_6$ formed after tail gas is absorbed by water. Crude $SiF_4$ and a solution containing HF and $H_2SO_4$ are obtained by extracting, adsorbing, and dehydrating the $H_2SiF_6$ solution. $SiF_4$ with a 5N purity is obtained after the crude $SiF_4$ is adsorbed and distilled, at the same time, an impurity-enriched $SiF_4$ is returned to operations of concentration and filtration to react with the solution containing HF and $H_2SiF_6$ to generate the $H_2SiF_6$ and $SiO_2$. High-purity HF and waste sulfuric acid are obtained after the $H_2SO_4$ solution containing HF is separated by steam stripping and distillation.

19 Claims, 2 Drawing Sheets

(56) References Cited

FOREIGN PATENT DOCUMENTS

| | | |
|---|---|---|
| CN | 102951611 A | 3/2013 |
| CN | 103803561 A | 5/2014 |
| CN | 103848426 A | 6/2014 |
| CN | 110606490 A | 12/2019 |
| CN | 111039294 A | 4/2020 |
| CN | 112158849 A | 1/2021 |
| CN | 112340703 A | 2/2021 |
| CN | 114988920 A | 9/2022 |
| GB | 1413333 A | 11/1975 |
| JP | 2000143227 A | 5/2000 |

OTHER PUBLICATIONS

Decision to Grant a Patent in Chinese Application No. 202210413670.0 dated Dec. 27, 2022, 3 pages.

METHODS FOR GRADED UTILIZATION OF FLUORINE AND SILICON RESOURCES IN PHOSPHATE ORES

CROSS-REFERENCE TO RELATED APPLICATIONS

This application is a continuation of International Application No. PCT/CN2023/081412, filed Mar. 14, 2023, which claims priority to Chinese patent application No. 202210413670.0, filed Apr. 20, 2022, the entire contents of which are incorporated herein by reference.

TECHNICAL FIELD

The present disclosure relates to the technical field of separation and purification of fluorine and silicon compounds, and in particular, to methods for graded utilization of fluorine and silicon resources in phosphate ores, which recovers and purifies fluorine and silicon compounds in a process of producing phosphoric acid and phosphate fertilizer using the phosphate ores as raw material.

BACKGROUND

The amount of phosphate ore mined in China amounts to more than 50 million tons per year, most of which is used to make phosphate fertilizer, phosphoric acid, and phosphates through a wet process—a phosphate ore reacting with sulfuric acid (nitric or hydrochloric acid in a few cases). The wet process produces large amounts of fluorine-containing and silicon-containing gases, which may seriously pollute the environment when directly discharged.

Most phosphate fertilizer companies may only absorb the fluorine-containing and silicon-containing gas with water to generate fluoro silicic acid, which only converts the waste gas into wastewater. Production of domestic phosphoric acid prepared by the wet process is more than 10 million tons per year, and by-product fluoro silicic acid is about 3.75 million tons. A few phosphate fertilizer companies convert the fluoro silicic acid into sodium silico fluoride ($Na_2SiF_6$). Only a few domestic enterprises successfully produce anhydrous hydrogen fluoride using fluorine resources associated with phosphate ores, achieving considerable economic and environmental benefits, but the by-product silica is under-utilized. Due to insufficient recycling of the fluorine-containing and silicon-containing gas, more than 1.5 million tons of fluorine resources are wasted in the annual tail gas of phosphate fertilizer, which is much larger than the total amount of fluorine in the annual domestic fluorspar production.

The fluoro silicic acid is an important intermediate product in the process of recovering the fluorine and silicon resources from the phosphate ore, and the higher the concentration of the fluoro silicic acid, the more favorable the subsequent treatment. So far, there have been a number of phosphate fertilizer companies practice for the long-term in the field of recycling fluorine and silicon resources in phosphate ore, and fluorine and silicon resources are generally absorbed through a pipeline spraying to obtain fluoro silicic acid with a mass fraction of about 18%. It has a relative technology difficulty to maintain a high fluorine recovery rate and obtain fluoro silicic acid solution with a high concentration. The process of preparing anhydrous hydrogen fluoride from the fluoro silicic acid is relatively mature, but the silica obtained in this preparation operation often contains 10% to 20% of fluorine, such that the application of the silica is greatly limited. The current defluorination and purification process of fluorine-containing silica cannot basically reduce the fluorine entrained in the process of silica generation.

In the process of producing anhydrous hydrogen fluoride or fluorine salts from the fluoro silicic acid, silica is generally produced by the hydration process of $SiF_4$, and its entrained fluorine includes two types: 1. free fluorine, accounting for about 70%, is mainly fluoro silicic acid adhering to the surface of silica, which may be removed by rinsing. 2. Lattice fluorine, accounting for about 30%, is caused by the Si—F functional group inside the bubble surrounded by a Si—O bond network generated by a gas-liquid interface reaction before contacting with water when the $SiF_4$ bubble contacts with water. Since lattice fluorine is protected by a solid Si—O bond network, once the lattice fluorine is formed, it cannot be removed by physical washing, and the Si—O bond must be loosened chemically to ensure entrance and exit of the material, thereby creating a condition for separation. The existing literature and patents basically follow this idea to study the process of defluorination, but do not focus on the nature of the reaction process between the $SiF_4$ and water, that is, finding a solution before the formation of lattice fluorine.

The production of crystalline silicon by a silane method is more energy efficient compared to the modified Siemens method. With the technological progress of the silane method, there is a growing interest on $SiF_4$, which is one of the important raw materials for the production of silane by a Hughes method. Domestic industry insiders have already tried to produce the polysilicon using $SiF_4$ as raw material, and focused on the fluorine and silicon resources in the phosphate ore. However, the production process also has some defects. Therefore, it is desirable to propose a method for graded utilization of fluorine and silicon resources in a phosphate ore, which may fully utilize the fluorine and silicon resources in the phosphate ore and reduce the waste of resources.

SUMMARY

The present disclosure provides a production process for the efficient and economical extraction of fluorine and silicon elements from phosphate ore and obtains a product with high purity. The production process is also applicable to the treatment of other fluorine-containing and silicon-containing phosphates.

To achieve the above purpose, the technical solution adopted in the present disclosure is a method for a graded utilization of fluorine and silicon resources in a phosphate ore, including follow steps.

Step (1), acidification: mixing sulfuric acid or phosphoric acid with the phosphate ore for reacting to produce dilute phosphoric acid or phosphate fertilizer while generating tail gas including fluorine and silicon. Main components of the tail gas are water steam and gaseous fluoro silicic acid.

If the dilute phosphoric acid is obtained, a fluorine-containing secondary steam and the fertilizer phosphoric acid with a $P_2O_5$ mass fraction of not less than 54% may be obtained after concentration; and the higher the concentration of the obtained phosphoric acid is, the more fluorine escapes. If the phosphate ore reacts with the sulfuric acid according to a reaction of producing calcium superphosphate, the product calcium superphosphate and fluorine-containing secondary steam may be directly obtained by passing superheated steam of not less than 140° C. into slurry for stripping fluoro silicic acid. The fluorine-containing secondary steam obtained by the two methods may be sent to step (2) for absorption together with the tail gas produced in the step (1).

Step (2), absorption: obtaining an acidic solution including fluorine and silicon by absorbing the tail gas and the fluorine-containing secondary steam with water.

In some embodiments, the absorption may be external cooling forced circulation three-stage countercurrent vacuum absorption. The unabsorbed tail gas is sent for deep absorption, absorbent of which is $Na_2CO_3$, $NaHCO_3$, or KOH solution, the adsorption temperature of which is not higher than 40° C. The unabsorbed tail gas reacts with absorbent to generate the corresponding precipitation salt so as to achieve deep absorption and meet environmental protection.

Step (3), osmotic thickening: obtaining a dilute acid solution or dilute salt solution by performing a forward osmosis operation on the acidic solution using a phosphate solution or phosphoric acid solution, wherein the phosphate solution or the phosphoric acid solution absorbs part of solvent of the acidic solution. The obtained dilute acidic solution is sent to mix with the phosphate ore in the step (1). The acidic solution increases in concentration to obtain a concentrated solution.

The boiling points of fluoro silicic acid and water are close, and difficulty of evaporating and concentrating fluoro silicic acid solution is very high. The present disclosure innovatively adopts a forward osmosis operation to concentrate the fluoro silicic acid to the fluoro silicic acid with a mass fraction of 45-60%, which provides great flexibility for subsequent operation. The phosphate solution or the phosphoric acid solution are selected as a driving fluid, which facilitates regeneration and recycling of the driving fluid in the production line of phosphoric acid and phosphate fertilizer.

Step (4), concentration and filtration: performing a concentration operation by passing silicon fluoride gas and the concentrated solution into a microemulsion reactor to continuously increase concentration of the concentrated solution; and filtering and separating the concentrated solution to obtain silicon dioxide ($SiO_2$), a fluorine-containing solution, and waste gas. The waste gas is sent to the step (2) to be adsorbed with the tail gas.

It should be noted that in the microemulsion reactor, the concentrated solution is mixed with the surfactant first, and then mixed with $SiF_4$, which is because the hydration process of $SiF_4$ is very easy to produce lattice fluorine and the lattice fluorine is protected by a strong Si—O bond network, once the lattice fluorine is formed, which cannot be removed by physical washing, the Si—O bonds need to be loosened chemically to ensure the entrance and exit of the material, thereby creating conditions for separation. The existing technology is to remove the lattice fluorine after lattice fluorine has been formed, which is extremely difficult. The present disclosure focuses on nature of reaction process between the $SiF_4$ and water, and seeks a solution before the formation of the lattice fluorine. That is, the concentrated solution is first mixed with the surfactant thoroughly, which is used to reduce the surface tension of the concentrated solution, so that the surface of the two phases has a larger contact area, tends to spread, and suppress the situation of functional group inside the bubble not contacting with the liquid. Thereafter, the concentrated solution is mixed with $SiF_4$ to improve the contact between the gas and liquid phases so as to suppress the formation of lattice fluorine in silica, and then silica with a high purity is obtained. In some embodiments, a volume ratio of the surfactant to the concentrated solution is within a range of 1:200 to 1:50.

Step (5), extraction: obtaining a loaded phase and a raffinate by adding an extract phase to the fluorine-containing solution, mixing and extracting thoroughly, and separating phases. The extract phase is composed of an extractant and a diluent, wherein a volume fraction of the extractant is not more than 80%, and the diluent is a mixture of one or more of kerosene, isopropyl ether, or $C_6$-$C_{14}$ hydrocarbons. In some embodiments, the extraction operation includes a cationic extraction and an anionic extraction, and the loaded phases after both the cationic extraction and the anionic extraction are recycled after washing and regenerating. The surfactant in the above step (4) may also be used directly as the extract phase for the cationic extraction.

In some embodiments, a volume ratio of the extract phase of cationic extraction to the fluorine-containing solution is within a range of 0.5:1 to 6:1, and the extractant of the extract phase of the cationic extraction is a mixture of one or more of organic phosphines, phospholipids, carboxylic acids, and sulfonic acid organic solvents. A volume ratio of the extract phase of the anionic extraction to the fluorine-containing solution is with a range of 0.5:1 to 6:1, and the extractant of the extract phase of the anionic extraction is an organic aminic extractant.

The loaded phase after the extraction of the cationic extract phase is recycled after water washing and regeneration with dilute sulfuric acid of 5% to 40%. A volume ratio of the loaded phase after the extraction of the cationic extract phase to water is within a range of 10:1 to 40:1, and a volume ratio of the loaded phase after the water washing to the dilute sulfuric acid of 5% to 40% is within a range of 10:1 to 40:1. The loaded phase after the extraction of the anionic extract phase is recycled after the water washing and regeneration with ammonia of 2% to 25%. A volume ratio of the loaded phase after extraction of anion extract phase to water is within a range of 10:1 to 40:1, and a volume ratio of the loaded phase after washing to the ammonia of 2% to 25% is within a range of 10:1 to 40:1. A wash residue produced after two water washing is returned to the step (2) for absorbing the tail gas, and a regeneration waste liquid produced after two regenerations is used for the acidification of the phosphate ore or fertilizer production.

Step (6), liquid adsorption: obtaining a refined solution by adsorbing and removing impurities from the raffinate; wherein an adsorption includes an activated carbon adsorption, a cation adsorption, and an anion adsorption, the activated carbon, a cation adsorbent, and an anion adsorbent are reused after being desorbed and regenerated when adsorption saturation.

In some embodiments, the desorption regeneration of the activated carbon is that the activated carbon is first desorbed with water, and then desorbed using a sodium hydroxide solution with a mass fraction of 5% to 10%. The desorption regeneration of the cationic adsorbent is that the cationic adsorbent is first desorbed with the water, and then desorbed using a sulfuric acid solution with a mass fraction of 5% to 20%. The desorption regeneration of the anion adsorbent is that the anion adsorbent is first desorbed with the water, and then desorbed using an ammonia with a mass fraction of 5% to 20%. A desorption temperature is within a range of 60° C. to 80° C. A desorption solution formed by the desorption of the water is returned to the step (2) to adsorb the tail gas. A desorption solution formed by the desorption of the sodium hydroxide solution and the ammonia water is used for the fertilizer production, and the desorption solution formed by the desorption of the sulfuric acid solution is used for the acidification of the phosphate ore.

Step (7), dehydration: obtaining crude $SiF_4$ and a HF-sulfuric acid solution by mixing a refined solution and a dehydrant thoroughly in a microemulsion reactor, and adsorbing water of the refined solution through full contact in two countercurrent stages to promote decomposition of the fluoro silicic acid. The anhydrous hydrogen fluoride with a purity of not less than 99% and waste sulfuric acid as a by-product are produced by performing steam stripping and distillation on the $HF—H_2SO_4$ solution. The waste sulfuric acid is sent to the step (1) to mix with the phosphate ore. The dehydrant is one or more of sulfur trioxide, fuming sulfuric acid, and concentrated sulfuric acid with a mass fraction greater than 93%. The microemulsion reactor is configured to enhance homogeneity of the material mixing in the dehydration process to inhibit production of fluoro silyl ether.

Step (8), decontamination: obtaining decontamination gas by adsorbing impurities in the crude $SiF_4$ through gaseous adsorption. The gaseous adsorption includes an activated carbon adsorption, a molecular sieve adsorption, and a modified adsorbent adsorption, and the activated carbon, molecular sieve, and modified adsorbent are reused after being desorbed and regenerated when adsorption saturation. The modified adsorbent is porous alumina oxide surface-modified by an organic amine, a silicon dioxide surface-modified by the organic amine, or a porous high-molecular polymer surface-modified by the organic amine.

In some embodiments, the activated carbon and the molecular sieve are regenerated by desorption of absolute dry nitrogen, the activated carbon and the molecular sieve first are desorbed at a temperature within a range of 100° C. to 150° C. and a pressure within a range of 0.2 MPaA to 0.3 MPaA, and desorbed gas is sent to the step (4) for concentrating the concentrated solution; and the activated carbon and the molecular sieve are then desorbed at a temperature within a range of 200° C. to 250° C. and a pressure within a range of 0.3 MPaA to 0.5 MPaA, and the desorbed gas is sent for fertilizer production. The activated carbon and the molecular sieve are regenerated by desorption of the absolute dry nitrogen gas and a mixture gas of ammonia-containing nitrogen with a volume fraction of ammonia within a range of 2% to 10%. The modified adsorbent is regenerated by desorption of the absolute dry nitrogen gas and a mixture gas of the ammonia-containing nitrogen with the volume fraction of ammonia within a range of 2% to 10%. The desorption temperature is greater than 100° C. and the desorption pressure is not greater than 80 KPaA. The desorbed gas formed by the absolute dry nitrogen gas is sent to the concentration and filtration step of the fluoro silicic acid solution; and the desorbed gas formed by the mixture gas of the ammonia-containing nitrogen gas is sent to a tail wash section of the fertilizer production.

Step (9), low-temperature distillation: obtaining impurity gas, and $SiF_4$ with a high purity of not less than 99% by performing a low-temperature distillation on the decontamination gas to remove impurities with low and high boiling points. The impurity gas as $SiF_4$ is passed into the concentrated solution in the step (4). In some embodiments, the low temperature distillation includes a first-stage distillation and a second-stage distillation; wherein the first-stage distillation is to remove the impurities with the low boiling point, a pressure at a top of a tower is within a range of 0.95 MPaA to 1.15 MPaA, a temperature at the top of the tower is within a range of −56° C. to −51° C., a pressure of a tower kettle is within a range of 1.0 MPaA to 1.2 MPaA, a temperature of the tower kettle is within a range of −51° C. to −47° C.; and the second-stage distillation is to remove the impurities with the high boiling point, the pressure at the top of the tower is within a range of 0.85 MPaA to 1.05 MPaA, the temperature at the top of the tower is within a range of 60° C. to −55° C., the pressure of the tower kettle is within a range of 0.9 MPaA to 1.1 MPaA, the temperature of the tower kettle is within a range of −55° C. to −50° C.

Compared with the prior art, the present disclosure has the following beneficial effects.

The present disclosure integrates the whole system. The wet process acid production from phosphate ore, the fertilizer production, fluorine production and silicon production are integrated in a whole system, and "three wastes" of by-produced in the production of high purity fluorine and silicon product are fully and reasonably utilized to achieve zero emission and zero pollution, which is impossible to achieve by using the fluoro silicic acid alone to produce $SiF_4$.

The product system of the present disclosure is flexible. The ratio of $SiF_4$, $SiO_2$ and HF is adjustable.

The present disclosure adopts the forward osmosis to concentrate the solution containing fluorine and silicon (mainly the fluoro silicic acid), and the mass fraction of the concentrated solution may be as high as 60%. In this way, the production of HF may be achieved while reducing the cycle amount of $SiF_4$, reducing the $SiO_2$ by-product, and also conducing to suppress the generation of fluoro silyl ether in $SiF_4$, which is not possible to achieve by vacuum concentration.

A fluorine recovery rate of present disclosure is high. Since the forward osmosis is adopted to concentrate the absorption liquid, the concentration of the absorption liquid may be relatively low, so that the fluorine and silicon in the gas phase of the acidification process may be absorbed more thoroughly.

The present disclosure creatively focuses on the nature of the reaction between $SiF_4$ and water, and seeks a solution before the formation of the lattice fluorine. That is, the concentrated solution and the surfactant are mixed thoroughly in the microemulsion reactor first, and then mixed with the $SiF_4$ to improve the contact between the gas and liquid phases, thereby inhibiting the formation of the lattice fluorine in the silica and obtaining silica with a high purity. Meanwhile, the adoption of microemulsion reactor may enhance the homogeneity of the material mixing and inhibit the formation of the fluoro silyl ether in $SiF_4$ and the entrapment of HF, which provides a reliable guarantee for obtaining the $SiF_4$ with the high purity.

The present disclosure adds operations of the extraction and the liquid adsorption, which not only pre-removes a large number of metal ion impurities and organic matter from the system, but more importantly, considers the removal of the anionic impurities including chloride, thereby ensuring reliability of purity of product.

BRIEF DESCRIPTION OF THE DRAWINGS

The present disclosure will be further illustrated by way of exemplary embodiments, which will be described in detail by way of the accompanying drawings. These embodiments are not limiting, and in these embodiments, the same counting indicates the same structure, wherein.

DETAILED DESCRIPTION

Figure 1:
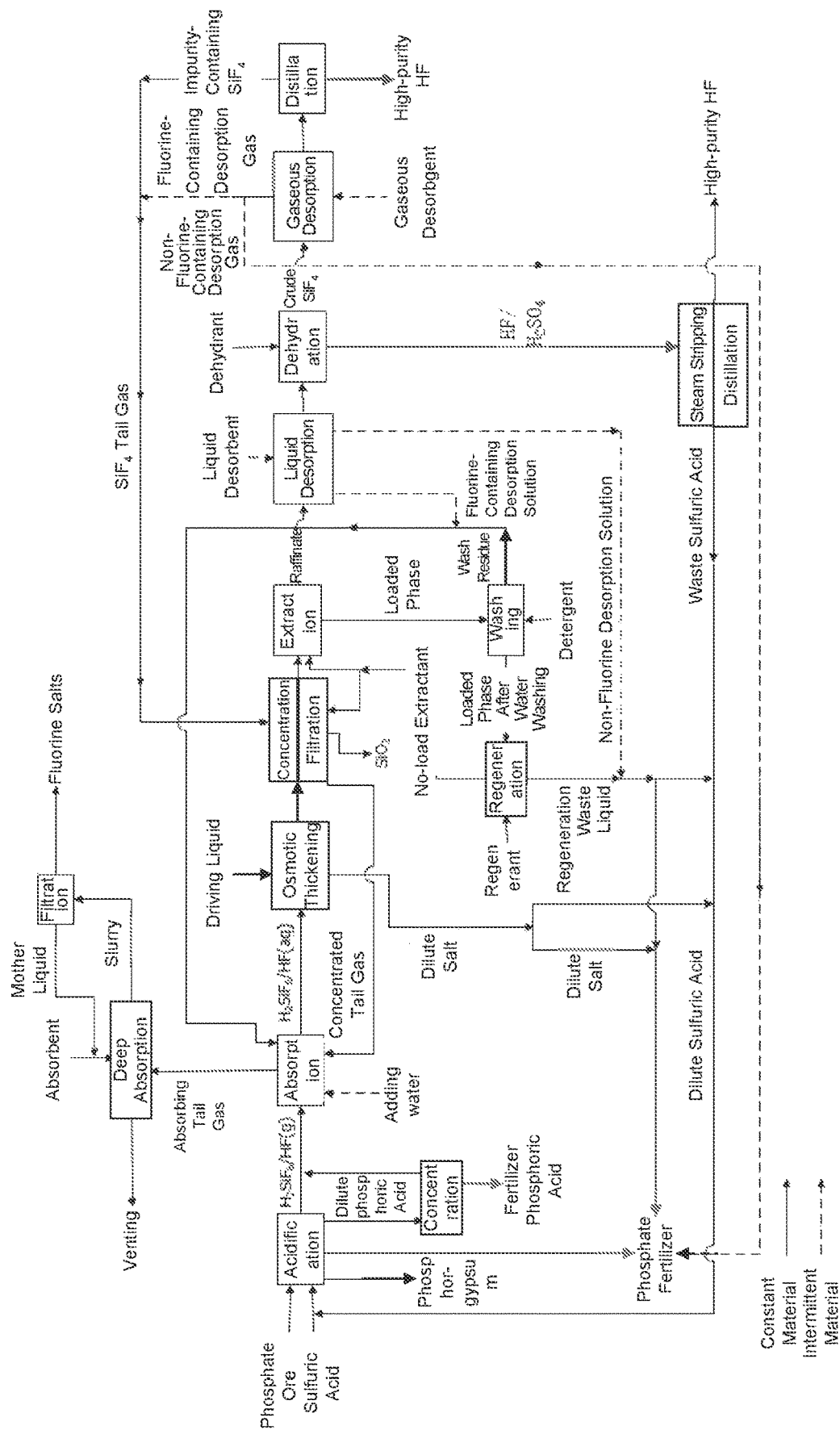
FIG. 1 is a schematic diagram illustrating a process of a method for graded utilization of fluorine and silicon resources in the phosphate ore according to some embodiments of the present disclosure.

To more clearly illustrate the technical solutions of the embodiments of the present disclosure, the accompanying drawings that need to be used in the description of the embodiments would be briefly introduced below. Obviously, the accompanying drawing in the following description is merely some examples or embodiments of the present disclosure, and those skilled in the art can apply the present disclosure to other similar situations according to the drawings without any creative effort. Unless obviously obtained from the context or the context illustrates otherwise, the same numeral in the drawings indicates the same structure or operation.

As used in the present disclosure and the appended claims, the singular forms "a," "an," and "the" are intended to include plural referents, unless the content clearly dictates otherwise. Generally, the terms "comprise" and "include" only imply that the clearly identified steps, elements and/or materials are included, but these steps, elements and/or materials do not constitute an exclusive list, and the method or platform may further include other steps, elements and/or materials.

The term "comprise" or "include" of the present disclosure, and any variation thereof, is intended to cover non-exclusive inclusion. Processes and methods that include a series of steps, for example, are not limited to the listed steps, but optionally also include steps that are not listed, or optionally also include other steps that are inherent to those processes and methods.

The embodiment provides a method for graded utilization of fluorine and silicon resources in a phosphate ore.

In some embodiments, a method for the graded utilization of fluorine and silicon resources in the phosphate ore may include the following operations.

(1) Acidification: mixing sulfuric acid or phosphoric acid with the phosphate ore for reacting to produce dilute phosphoric acid or phosphate fertilizer while generating tail gas including fluorine and silicon.

(2) Absorption: obtaining an acidic solution including fluorine and silicon by absorbing the tail gas with water.

(3) Osmotic thickening: obtaining a dilute solution by performing an osmosis operation on the acidic solution using a driving solution. The driving solution absorbs part of solvent of the acidic solution to obtain the dilute solution; and the acidic solution increases in concentration to obtain a concentrated solution. The osmosis operation is a forward osmosis, wherein the driving solution is a phosphate solution or a phosphoric acid solution, and the dilute solution includes a dilute phosphate solution or a dilute phosphoric acid solution.

The forward osmosis is a membrane separation process that spontaneously achieve water transmission relying on osmotic pressure difference between two sides of a selective osmosis membrane as the driving force. The driving fluid and a raw material fluid are separately located both sides of the membrane, and the osmotic pressure of which is different. The solvent may spontaneously pass through the membrane to the side with high osmotic pressure until the osmotic pressure of both sides is balanced, while solute does not pass through the membrane, thereby realizing a change of solution concentration, which is a countercurrent osmosis method. Compared with a reverse osmosis, the forward osmosis does not require high pressure and is an energy efficient concentration method.

(4) Concentration and filtration: performing a concentration operation by passing silicon fluoride gas into the concentrated solution to continuously increase concentration of the concentrated solution; and filtering and separating the concentrated solution to obtain silicon dioxide ($SiO_2$), a fluorine-containing solution, and waste gas.

(5) Extraction: obtaining a loaded phase and a raffinate by adding an extract phase to the fluorine-containing solution, mixing and extracting thoroughly, and separating phases. The raffinate is the remaining solution obtained after the solution is extracted by the extract phase. In some embodiments, the raffinate may be a preliminary purified fluoro silicic acid solution.

(6) Liquid adsorption: obtaining a refined solution by adsorbing and removing impurities from the raffinate.

(7) Dehydration: obtaining crude $SiF_4$ and an HF-sulfuric acid ($H_2SO_4$) solution by adding a dehydrant to the refined solution and mixing thoroughly, and producing anhydrous hydrogen fluoride with a purity of not less than 99% and waste sulfuric acid as a by-product by performing steam stripping and distillation on the HF—$H_2SO_4$ solution.

(8) Decontamination: obtaining decontamination gas by adsorbing the impurities in the crude $SiF_4$ by gaseous adsorption. The decontamination gas is the gas after removal of partial impurities by gaseous adsorption. In some embodiments, the decontamination gas is refined $SiF_4$.

(9) Low-temperature distillation: obtaining the impurity gas, and the $SiF_4$ with a purity of not less than 99% by performing a low-temperature distillation on the decontamination gas to remove the impurities with low and high boiling points. The impurity gas is $SiF_4$ containing the impurities, for example, the $SiF_4$ with a purity of less than 99%.

In some embodiments, the dilute acid solution obtained in the step (3) and the waste sulfuric acid obtained in the step (7) are sent to the step (1) to be mixed with the phosphate ore. The waste gas obtained in the step (4) is sent to the step (2) to be absorbed with the tail gas. The impurity gas obtained in the step (9) as the $SiF_4$ is sent to the concentrated solution in the step (4).

In some embodiments, in the step (1), the phosphate ore reacts with the sulfuric acid according to a reaction of producing calcium superphosphate, and superheated steam of not less than 140° C. is introduced into a slurry for steam stripping fluoro silicic acid to obtain product calcium superphosphate and fluorine-containing secondary steam, and the fluorine-containing secondary steam is sent to the step (2) for absorption together with the tail gas produced in the step (1).

In some embodiments, the sulfuric acid or the phosphoric acid in step (1) is mixed with the phosphate ore to obtain the dilute phosphoric acid, and the dilute phosphoric acid is concentrated to obtain the fluorine-containing secondary steam and fertilizer phosphoric acid with a $P_2O_5$ mass fraction of not less than 54%. The fluorine-containing secondary steam is sent to the step (2) for absorption together with the tail gas produced in the step (1).

In some embodiments, an external cooling forced circulation three-stage countercurrent vacuum absorption is adopted in the step (2), and each stage of absorption adopts a parallel contact form of spraying in an upper section and filling in a lower section, a droplet particle size of spray is within a range of 100 μm to 300 μm, and a temperature of the each stage of a circulation liquid is not higher than 60° C.

The external cooling forced circulation three-stage countercurrent vacuum absorption means that an evaporative three-stage countercurrent forced circulation production device is adopted for vacuum absorption. A countercurrent flow is adopted between stages to obtain a high concentration of the solution; a parallel flow within the stage is adopted to reduce fluid resistance; and the each stage of absorption adopts a parallel contact form of spraying in an upper section and filling in a lower section to achieve rapid mass transmission and less entrainment of mist. External cooling means that the circulating absorption liquid is cooled by a heat exchanger before contacting with the gas, and the low temperature is conducive to the dissolution of gas in the liquid.

In some embodiments, the unabsorbed tail gas in the step (2) is sent for deep absorption; wherein an absorbent used for the deep absorption includes $Na_2CO_3$, $NaHCO_3$, or $KOH$ solution, and a temperature of the deep absorption is not higher than 40° C.

In some embodiments, the concentration operation in the step (4) is performed in the microemulsion reactor.

In some embodiments, in the concentration operation of the step (4), the concentrated solution is first thoroughly mixed with a surfactant and then mixed with $SiF_4$; and a volume ratio of the surfactant to the concentrated solution is within a range of 1:200 to 1:50. In some embodiments, the surfactant is the extract phase for cationic extraction.

In some embodiments, the extract phase in the step (5) is composed of an extractant and a diluent, a volume fraction of the extractant is not more than 80%, and the diluent is a mixture of one or more of kerosene, isopropyl ether, or $C_6$-$C_{14}$ hydrocarbons.

In some embodiments, the extraction of step (5) includes a cationic extraction and an anionic extraction, and the loaded phases after the cationic extraction and the anionic extraction are washed and regenerated for recycling.

In some embodiments, a volume ratio of the extract phase for cationic extraction to the fluorine-containing solution is within a range of 0.5:1 to 6:1, and the extractant of a cationic extract phase is a mixture of one or more of organic phosphines, phospholipids, carboxylic acids, and sulfonic acid organic solvents. A volume ratio of the extract phase for anionic extraction to the fluorine-containing solution is within a range of 0.5:1 to 6:1, and the extractant of an anionic extract phase is an organic amine extractant.

In some embodiments, the loaded phase after extraction of the cationic extract phase is recycled after water washing and regeneration with the dilute sulfuric acid of 5% to 40%, a volume ratio of the loaded phase after the extraction of the cationic extract phase to water is within a range of 10:1 to 40:1, and a volume ratio of the loaded phase after the water washing to the dilute sulfuric acid is within a range of 10:1-40:1. The loaded phase after extraction of anionic extract phase is recycled after the water washing and regeneration with ammonia of 2%-25%, a volume ratio of loaded phase after the extraction of the anionic extract phase to water is within a range of 10:1-40:1, and a volume ratio of the loaded phase after the water washing to the ammonia of 2%-25% is within a range of 10:1-40:1. A wash residue produced after two water washing is returned to the step (2) for absorbing the tail gas, and a regeneration waste liquid produced after two regenerations is used for the acidification of the phosphate ore or fertilizer production.

In some embodiments, the liquid adsorption in the step (6) includes an activated carbon adsorption, a cation adsorption, and an anion adsorption. The activated carbon, a cation adsorbent, and an anion adsorbent are reused after being desorbed and regenerated when adsorption saturation. In some embodiments, the desorption regeneration of the activated carbon is that the activated carbon is first desorbed with water, and then desorbed using a sodium hydroxide solution with a mass fraction of 5%-10%. In some embodiments, the desorption regeneration of the cationic adsorbent is that the cationic adsorbent is first desorbed with the water, and then desorbed using a sulfuric acid solution with a mass fraction of 5%-20%. In some embodiments, the desorption regeneration of the anion adsorbent is that the anion adsorbent is first desorbed with the water, and then desorbed using ammonia with a mass fraction of 5%-25%. A desorption temperature is within a range of 60° C. to 80° C.; and a desorption solution formed by the desorption of the water is returned to the step (2) to adsorb the tail gas, a desorption solution formed by the desorption of the sodium hydroxide solution and the ammonia water is used for the fertilizer production, and the desorption solution formed by the desorption of the sulfuric acid solution is used for the acidification of the phosphate ore.

In some embodiments, the refined solution in the step (7) is dehydrated with a dehydrant in the microemulsion reactor by two-stage countercurrent contact. In some embodiments, the dehydrant in the step (7) is one or more of sulfur trioxide, fuming sulfuric acid, and concentrated sulfuric acid with a mass fraction greater than 93%.

In some embodiments, the gaseous adsorption in the step (8) includes an activated carbon adsorption, a molecular sieve adsorption, and a modified adsorbent adsorption, and the activated carbon, molecular sieve, and modified adsorbent are reused after being adsorbed and regenerated when adsorption saturation.

In some embodiments, the activated carbon and the molecular sieve are regenerated by desorption of absolute dry nitrogen, the activated carbon and the molecular sieve first are desorbed at a temperature within a range of 100° C. to 150° C. and a pressure within a range of 0.2 MPaA to 0.3 MPaA, and desorption gas is sent to the step (4) for concentrating the concentrated solution. The activated carbon and the molecular sieve are then desorbed at a temperature within a range of 200° C. to 250° C. and a pressure within a range of 0.3 MPaA to 0.5 MPaA, and the desorbed gas is sent for the fertilizer production.

In some embodiments, the activated carbon, the molecular sieve, and the modified adsorbent are regenerated by desorption of the absolute dry nitrogen gas and a mixture gas of ammonia-containing nitrogen with an ammonia volume fraction of 2% to 10%. The desorption temperature is greater than 100° C. and the desorption pressure is not greater than 80 KPaA. The desorbed gas formed by the absolute dry nitrogen gas is sent to the concentrated solution of the step (4); and the desorbed gas formed by the mixture gas of the ammonia-containing nitrogen gas is sent to a tail wash section of the fertilizer production.

In some embodiments, the modified adsorbent is porous alumina oxide surface-modified by an organic amine, a silicon dioxide surface-modified by the organic amine, or a porous high-molecular polymer surface-modified by the organic amine.

In some embodiments, the low-temperature distillation in the step (9) includes a first-stage distillation and a second-stage distillation. The first-stage distillation is to remove the impurities with the low boiling point, a pressure at a top of a tower is within a range of 0.95 MPaA to 1.15 MPaA, a temperature at the top of the tower is within a range of −56° C. to −51° C., a pressure of a tower kettle is within a range of 1.0 MPaA to 1.2 MPaA, and a temperature of the tower kettle is within a range of −51° C. to −47° C. The second-stage distillation is to remove the impurities with the high boiling point, the pressure at the top of the tower is within a range of 0.85 MPaA to 1.05 MPaA, the temperature at the top of the tower is within a range of 60° C. to −55° C., the pressure of the tower kettle is within a range of 0.9 MPaA to 1.1 MPaA, and the temperature of the tower kettle is within a range of −55° C. to −50° C.

Embodiment 1

A method for graded utilization of fluorine and silicon in a phosphate ore specifically includes the following operations.

(1) acidification: the phosphate ore was reacted with sulfuric acid according to a hemihydrate-dihydrate method to obtain fertilizer phosphoric acid with 38% of $P_2O_5$, which was then concentrated to fertilizer phosphoric acid with 55% of $P_2O_5$. The concentration technology is prior art, i.e., the vacuum evaporation. The fluorine-containing secondary steam was sent to step (2) for absorption together with the tail gas produced in acidification.

(2) absorption: a fluoro silicic acid solution with a mass fraction of 15% was obtained by absorbing the tail gas produced during the acidification through a three-stage countercurrent absorption at 40° C., and a fluorine recovery rate was 96%. The absorbed tail gas was sent to react with a sodium carbonate solution to obtain a small amount of sodium fluorosilicate.

Figure 2:
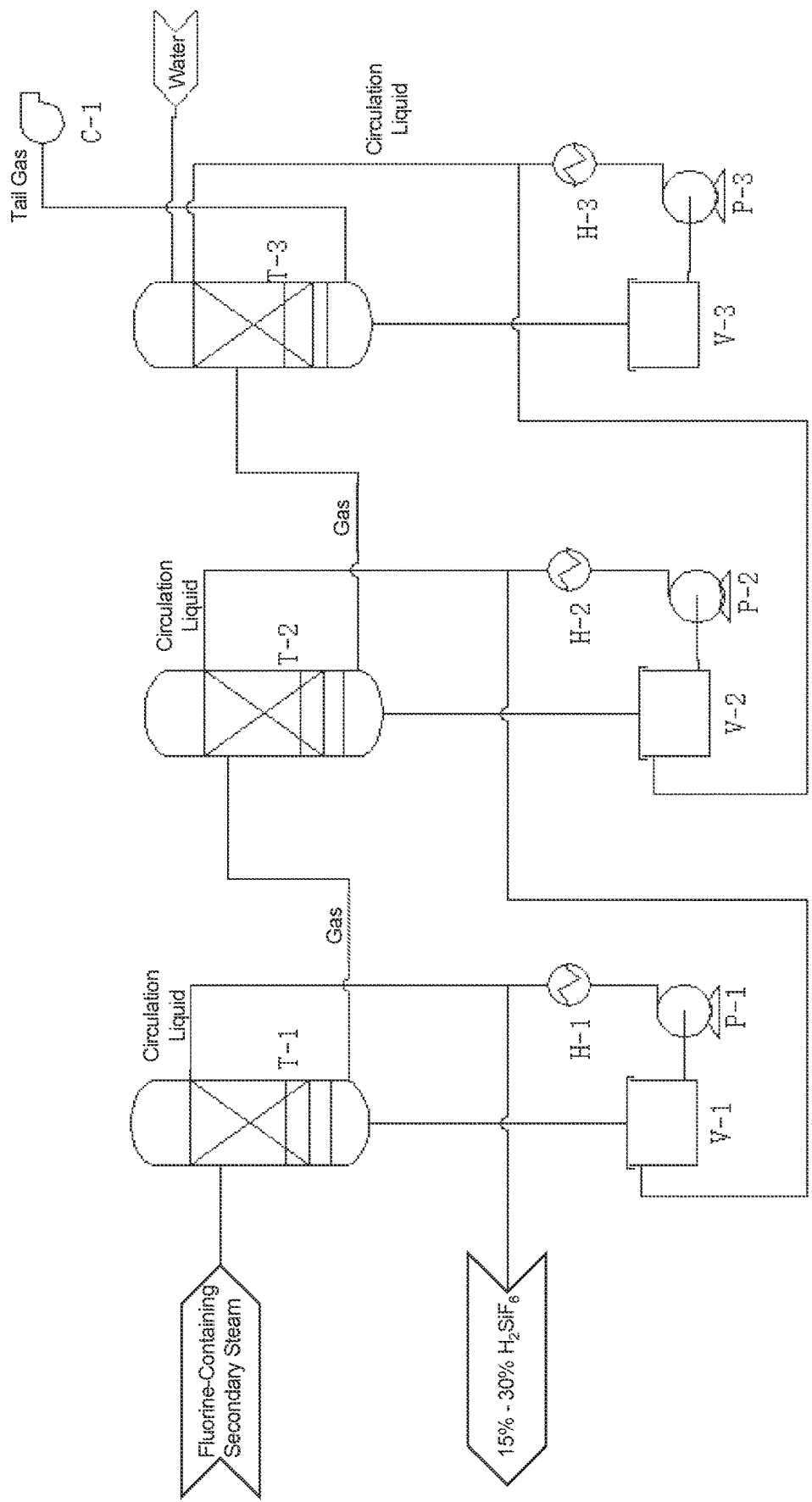
FIG. 2 is a flowchart illustrating a process of fluorine-containing gas absorption according to some embodiments of the present disclosure.

A three-stage countercurrent vacuum absorption adopted in the present embodiment refers to the external cooling forced circulation three-stage countercurrent vacuum adsorption. The external cooling forced circulation three-stage countercurrent vacuum adsorption means that an evaporative three-stage countercurrent forced circulation production device is adopted for vacuum absorption, a countercurrent flow is adopted between stages to obtain a high concentration of the solution; a parallel flow within the stage is adopted to reduce fluid resistance; and each stage of absorption adopts a parallel contact form of spraying in an upper section and filling in a lower section to achieve rapid mass transmission and less entrainment. The external cooling means that the circulating absorption liquid is cooled by the heat exchanger and then contacted with the gas, and the low temperature is conducive to the dissolution of the gas in the liquid. The setting conditions were that a droplet particle size of spray is within a range of 100 μm to 300 μm, and a temperature of circulating liquid of each stage was not higher than 60° C. Referring to FIG. 2, a flowchart illustrating a process of fluorine-containing gas absorption included three absorption towers (T-1, T-2, T-3) placed side by side, and fluorine-containing secondary steam was absorbed through T-1, T-2 and T-3 sequentially and then discharged as tail gas driven by fan C-1. The circulating liquid then passed through T-3, T-2, and T-1 sequentially, and countercurrently flow with the fluorine-containing secondary steam for absorbing. In an absorption tower, there was a vacant spraying area in an upper section and a filling area in a lower section. The circulating liquid entered the absorption tower and formed spray through a spraying device in the tower, then fell to the filling area and condensed into a liquid to achieve full contact with the fluorine-containing secondary steam for absorption, and the absorption liquid was cooled by a cooler H after passing through a buffer tank V and a centrifugal pump P. The cooled absorption liquid might enter a corresponding absorption tower for reabsorption, or enter a next level of absorption tower for absorption. In this way, the concentration of the absorption liquid might be relatively low, so that the fluorine and silicon in the gas phase of the acidification process might be absorbed more thoroughly. Therefore, the fluorine recovery rate of the present disclosure was extremely high. The following embodiments used the same absorption method, which was not repeated herein.

(3) osmotic thickening: a forward osmosis was adopted to concentrate the fluoro silicic acid with the mass fraction of 15% to the fluoro silicic acid with the mass fraction of 45% by countercurrent osmosis using the phosphoric acid with 55% of $P_2O_5$ as a driving liquid, and the produced dilute phosphoric acid was returned to the acidification operation. More descriptions regarding the forward osmosis may be found in the previous related descriptions.

(4) extraction and filtration: a cationic extractant (75% volume of P507+25% volume of kerosene) accounting for 1/50 of the volume of the fluoro silicic acid solution was added to the fluoro silicic acid solution of 45%, the mixture fully contacted with impurity-containing $SiF_4$ produced by distillation and gaseous desorption in a microemulsion reactor, and then, after standing clarification for 20 minutes, the fluoro silicic acid solution was concentrated to the fluoro silicic acid solution with a mass fraction of 50%, while producing silica to be filtered.

(5) extraction: 1 part by volume of fluoro silicic acid solution of 50% was extracted by 0.5 part by volume of cationic extractant (75% volume of P507+25% volume of kerosene), and then 1 part by volume of the raffinate was extracted by 0.5 part by volume of anionic extractant (75% volume of N-dimethyldodecylamine+25% volume of kerosene) to obtain the preliminary purified fluoro silicic acid solution. The loaded phase after extraction of the cationic extract phase was recycled after water washing and regeneration with the dilute sulfuric acid of 5%, a volume ratio of the loaded phase after the extraction of the cationic extract phase to water was 10:1, and a volume ratio of the loaded phase after the water washing to the dilute sulfuric acid of 5% was 10:1. The loaded phase after extraction of anionic extract phase was recycled after water washing and regeneration with ammonia of 2%, and a volume ratio of the loaded phase after extraction of anionic extract phase to water was 10:1, and the volume ratio of the loaded phase after washing to ammonia of 2% was 10:1.

(6) liquid adsorption: a refined fluoro silicic acid solution was obtained by deeply removing the impurity of the preliminary purified fluoro silicic acid solution through activated carbon, cation resin, and anion resin, sequentially. When regeneration, the activated carbon, cation resin, and anion resin were rinsed with desalted water first, and the wash water was returned to the absorption process of the acidification of tail gas. Then the activated carbon was washed using a sodium hydroxide solution with a mass fraction of 5%, the anion resin was washed using ammonia with a mass fraction of 5%, and then the activated carbon and anion resin was rinsed using desalted water, and produced wastewater was sent to a phosphate fertilizer production line for absorption of the tail gas. The cation resin was washed using a sulfuric acid solution with a mass fraction of 5%, then rinsed with the desalted water, and the produced wastewater was sent to the acidification process. The desorption temperature was set to 60° C.

(7) dehydration: sulfuric acid of 98% and the refined fluoro silicic acid solution completed dehydration in a microemulsion reactor through a two-stage countercurrent contact to obtain crude $SiF_4$ and the sulfuric acid solution containing hydrogen fluoride. The sulfuric acid solution containing hydrogen fluoride was defluorinated by steam stripping and turned into waste sulfuric acid, which was sent to acidification of the phosphate ore. The gas phase of the steam stripping was distilled to obtain anhydrous hydrogen fluoride.

(8) decontamination by gaseous adsorption: the crude $SiF_4$ was adsorbed by activated carbon, molecular sieve, and porous alumina oxide surface-modified by an organic amine sequentially to obtain refined $SiF_4$.

The activated carbon and the molecular sieve were regenerated by desorption of absolute dry nitrogen, the activated carbon and the molecular sieve first were desorbed at a temperature of 100° C. and a pressure of 0.2 MPaA, and the desorbed gas was sent to the step (4) for concentrating the concentrated solution. Then the activated carbon and the molecular sieve were desorbed at a temperature of 200° C. and a pressure of 0.3 MPaA, and the desorbed gas was sent to fertilizer production. The activated carbon, the molecular sieve, and the modified adsorbent were regenerated by desorption of the absolute dry nitrogen gas and a mixture gas of ammonia-containing nitrogen with a volume fraction of ammonia of 2%; and the desorption temperature was 105° C. and the desorption pressure was 80 KPaA. The desorbed gas formed by the absolute dry nitrogen gas was sent to the concentrated solution of the step (4); and the desorbed gas formed by the mixture gas of the ammonia-containing nitrogen gas was sent to a tail wash section of the fertilizer production.

(9) low-temperature distillation: the $SiF_4$ with a high purity of not less than 99% was obtained by performing two stages distillation (also referred to as low-temperature distillation) on the refined $SiF_4$. The impurity-containing $SiF_4$ was sent to the operation of concentration and filtration for the fluoro silicic acid solution.

The first-stage distillation was to remove the impurities with the low boiling point, a pressure at a top of a tower was 0.95 MPaA and a temperature at the top of the tower was −56° C., and a pressure of a tower kettle was 1.0 MPaA and a temperature of a tower kettle was −51° C. The second-stage distillation was to remove the impurities with the high boiling point, the pressure at a top of a tower was 0.85 MPaA, the temperature at the top of the tower was −60° C., the pressure of a tower kettle was 0.9 MPaA, and the temperature of a tower kettle was −55° C.

Embodiment 2

A method for graded utilization of fluorine and silicon in a phosphate ore specifically includes the following operations.

(1) acidification: the phosphate ore reacted with sulfuric acid according to a dihydrate method to obtain fertilizer phosphoric acid with 23% of $P_2O_5$, which was then concentrated to fertilizer phosphoric acid with 55% of $P_2O_5$. The concentration technology is prior art, i.e., the vacuum evaporation. The fluorine-containing secondary steam was sent to step (2) for absorption together with the tail gas produced in acidification.

(2) absorption: a fluoro silicic acid solution with a mass fraction of 18% was obtained by absorbing the tail gas produced during the acidification through a three-stage countercurrent absorption at 42° C., and a fluorine recovery rate was 90%. The absorbed tail gas was sent to react with a $NaHCO_3$ solution to obtain a small amount of sodium fluorosilicate. More descriptions regarding the three-stage countercurrent absorption may be found in previous related descriptions.

(3) osmotic thickening: a forward osmosis was adopted to concentrate the fluoro silicic acid with the mass fraction of 18% to the fluoro silicic acid with the mass fraction of 47% by countercurrent and osmosis using a saturated monoammonium phosphate solution as a driving liquid, and the produced dilute ammonium phosphate was returned to a phosphate fertilizer production line. More descriptions regarding the forward osmosis may be found in the previous related descriptions.

(4) extraction and filtration: a cationic extractant (75% volume of P204+25% volume of heptane) accounting for 1/100 of the volume of the fluoro silicic acid solution was added to the fluoro silicic acid solution of 47%, the mixture fully contacted with impurity-containing $SiF_4$ gas produced through distillation and gaseous desorption in a microemulsion reactor, and then, after standing clarification for 20 minutes, the fluoro silicic acid solution was concentrated to the fluoro silicic acid solution with a mass fraction of 52%, while producing silica to be filtered.

(5) extraction: 1 part by volume of fluoro silicic acid solution of 52% was extracted by 1 part by volume of cationic extractant (75% volume of P204+25% volume of heptane), and then, 1 part by volume of the raffinate was extracted by 1 part by volume of anionic extractant (75% volume of N-235+25% volume of heptane) to obtain the preliminary purified fluoro silicic acid solution. The loaded phase after extraction of the cationic extract phase was recycled after water washing and regeneration with the dilute sulfuric acid of 15%, a volume ratio of the loaded phase after the extraction of the cationic extract phase to water was 20:1, and a volume ratio of the loaded phase after the water washing to the dilute sulfuric acid of 15% was 20:1. The loaded phase after extraction of anionic extract phase was recycled after water washing and regeneration with ammonia of 12%, the volume ratio of the loaded phase after extraction of anionic extract phase to water was 20:1, and the volume ratio of the loaded phase after washing to ammonia of 12% is 20:1.

(6) liquid adsorption: a refined fluoro silicic acid solution was obtained by deeply removing the impurity of the preliminary purified fluoro silicic acid solution through activated carbon, cation resin, and anion resin, sequentially. When regeneration, the activated carbon, cation resin, and anion resin were rinsed with desalted water first, and the wash water was returned to the absorption process of the acidification of tail gas. Then the activated carbon was washed using sodium hydroxide solution with a mass fraction of 10%, the anion resin was washed using ammonia with a mass fraction of 10%, and then the activated carbon and anion resin were rinsed with desalted water, and produced wastewater was sent to a phosphate fertilizer production line for absorption of the tail gas. The cation resin was washed using a sulfuric acid solution with a mass fraction of 20%, and then rinsed with the desalted water, and the produced wastewater was sent to the acidification process. The desorption temperature was set to 70° C.

(7) dewatering: a sulfuric trioxide solution of 101% and the refined fluoro silicic acid solution completed dehydration in a microemulsion reactor through a two-stage countercurrent contact to obtain crude $SiF_4$ and the sulfuric acid solution containing hydrogen fluoride. The sulfuric acid solution containing hydrogen fluoride was defluorinated by steam stripping and turned into waste sulfuric acid, which was sent to acidification of phosphate ore. The gas phase of the steam stripping was distilled to obtain anhydrous hydrogen fluoride.

(8) decontamination by gaseous adsorption: the crude $SiF_4$ was desorbed by activated carbon, molecular sieve, and porous high-molecular polymer surface-modified by the organic amine sequentially to obtain refined $SiF_4$.

The activated carbon and the molecular sieve were regenerated by desorption of absolute dry nitrogen, the activated carbon and the molecular sieve first were desorbed at a temperature of 120° C. and a pressure of 0.2 MPaA, and the desorbed gas was sent to the step (4) for concentrating the concentrated solution. Then the activated carbon and the molecular sieve were desorbed at a temperature of 220° C. and a pressure of 0.4 MPaA, and the desorbed gas was sent to fertilizer production. The activated carbon, the molecular sieve, and the modified adsorbent were regenerated by desorption of the absolute dry nitrogen gas and a mixture gas of ammonia-containing nitrogen with a volume fraction of ammonia of 5%. The desorption temperature was 110° C. and the desorption pressure was 75 KPaA; the desorbed gas formed by the absolute dry nitrogen gas was sent to the concentrated solution of the step (4); and the desorbed gas formed by the mixture gas of the ammonia-containing nitrogen gas was sent to a tail wash section of the fertilizer production.

(9) low-temperature distillation: the $SiF_4$ with a high purity of not less than 99.99% was obtained by performing two stages distillation on the refined $SiF_4$. The impurity-containing $SiF_4$ was sent to the operation of concentration and filtration for the fluoro silicic acid solution.

The first-stage distillation was to remove the impurities with the low boiling point, a pressure at a top of a tower was 1.00 MPaA and a temperature at the top of the tower was −50° C., and a pressure of a tower kettle was 1.0 MPaA and a temperature of a tower kettle was −58° C. The second-stage distillation was to remove the impurities with the high boiling point, the pressure at a top of a tower was 1.00 MPaA, the temperature at the top of the tower was −58° C., the pressure of a tower kettle was 1.00 MPaA, and the temperature of a tower kettle was −54° C.

Embodiment 3

A method for graded utilization of fluorine and silicon in a phosphate ore specifically includes the following operations.

(1) acidification: the phosphate ore reacted with the sulfuric acid according to a reaction of producing calcium superphosphate, and superheated steam of not less than 140° C. was introduced into a slurry for steam stripping. The fluorine-containing secondary steam was sent to step (2) for absorption together with the tail gas produced in acidification.

(2) absorption: a fluoro silicic acid solution with a mass fraction of 25% was obtained by absorbing the tail gas produced during the acidification through a three-stage countercurrent absorption at 40° C., and a fluorine recovery rate was 78%. The absorbed tail gas was sent to react with a KOH solution to obtain a small amount of potassium fluorosilicate. More descriptions regarding the three-stage countercurrent absorption may be found in previous related descriptions.

(3) osmotic thickening: a forward osmosis was adopted to concentrate the fluoro silicic acid with the mass fraction of 25% to the fluoro silicic acid with the mass fraction of 54% by countercurrent and osmosis using a saturated monoammonium phosphate solution as a driving liquid, and the produced dilute phosphoric acid was returned to a phosphate fertilizer production line. More descriptions regarding the forward osmosis may be found in the previous related descriptions.

(4) extraction and filtration: a cationic extractant (75% volume of β naphthalenesulfonic acid+25% volume of heptane) accounting for 1/150 of the volume of the fluoro silicic acid solution was added to the fluoro silicic acid solution of 54%, the mixture fully contacted with impurity-containing $SiF_4$ gas produced by distillation and gaseous desorption in a microemulsion reactor, and then, after standing clarification for 20 minutes, the fluoro silicic acid solution was concentrated to the fluoro silicic acid solution with the mass fraction of 60%, while producing silica to be filtered.

(5) extraction: 1 part by volume of fluoro silicic acid solution of 60% was extracted by 3 parts by volume of cationic extractant (75% volume of β naphthalenesulfonic acid+25% volume of heptane), and then, 1 part by volume of the raffinate was extracted by 3 parts by volume of anionic extractant (75% volume of N-235+25% volume of heptane) to obtain the preliminary purified fluoro silicic acid solution. The loaded phase after extraction of the cationic extract phase was recycled after water washing and regeneration with the dilute sulfuric acid of 30%, a volume ratio of the loaded phase after the extraction of the cationic extract phase to water was 30:1, and a volume ratio of the loaded phase after the water washing to the dilute sulfuric acid of 30% was 30:1. The loaded phase after extraction of anionic extract phase was recycled after water washing and regeneration with ammonia of 20%, the volume ratio of the loaded phase after extraction of anionic extract phase to water was 30:1, and the volume ratio of the loaded phase after washing to ammonia of 20% is 30:1.

(6) liquid adsorption: a refined fluoro silicic acid solution was obtained by deeply removing the impurity of the preliminary purified fluoro silicic acid solution through activated carbon, cation resin, and anion resin, sequentially. When regeneration, the activated carbon, cation resin, and anion resin were rinsed with desalted water first, and the wash water was returned to the absorption process of the acidification of tail gas. Then the activated carbon was washed using sodium hydroxide solution with a mass fraction of 5%, the anion resin was washed using ammonia with a mass fraction of 20%, and then the activated carbon and anion resin was rinsed with desalted water, and produced wastewater was sent to a phosphate fertilizer production line for absorption of the tail gas. The cation resin was washed using a sulfuric acid solution with a mass fraction of 18%, and then rinsed with the desalted water, and the produced wastewater was sent to the acidification process. The desorption temperature was set to 70° C.

(7) dewatering: a sulfuric acid of 93% and the refined fluoro silicic acid solution completed dehydration in a microemulsion reactor through a two-stage countercurrent contact to obtain crude $SiF_4$ and the sulfuric acid solution containing hydrogen fluoride. The solution was defluorinated by steam stripping and turned into waste sulfuric acid, which was sent to acidification of phosphate ore. The gas phase of the steam stripping was distilled to obtain anhydrous hydrogen fluoride.

(8) decontamination by gaseous adsorption: the crude $SiF_4$ was desorbed by activated carbon, molecular sieve, and silicon dioxide surface-modified by the organic amine sequentially to obtain refined $SiF_4$.

The activated carbon and the molecular sieve were regenerated by desorption of absolute dry nitrogen, the activated carbon and the molecular sieve first were desorbed at a temperature of 140° C. and a pressure of 0.25 MPaA, and the desorbed gas was sent to the step (4) for concentrating the concentrated solution. Then the activated carbon and the molecular sieve were desorbed at a temperature of 240° C. and a pressure of 0.4 MPaA, and the desorbed gas was sent to fertilizer production. The activated carbon, the molecular sieve, and the modified adsorbent were regenerated by desorption of the absolute dry nitrogen gas and a mixture gas of ammonia-containing nitrogen with a volume fraction of ammonia of 8%; and the desorption temperature was 114° C. and the desorption pressure was 75 KPaA. The desorbed gas formed by the absolute dry nitrogen gas was sent to the concentrated solution of the step (4); and the desorbed gas formed by the mixture gas of the ammonia-containing nitrogen gas was sent to a tail wash section of the fertilizer production.

(9) low-temperature distillation: the $SiF_4$ with a high purity of not less than 99.999% was obtained by performing two stages distillation on the refined $SiF_4$. The impurity-containing $SiF_4$ was sent to the operation of concentration and filtration for the fluoro silicic acid solution.

The first-stage distillation was to remove the impurities with the low boiling point, a pressure at a top of a tower was 1.10 MPaA and a temperature at the top of the tower was −52° C., and a pressure of a tower kettle was 1.1 MPaA and a temperature of a tower kettle was −48° C. The second-stage distillation was to remove the impurities with the high boiling point, the pressure at a top of a tower was 1.05 MPaA, the temperature at the top of the tower was −56° C., the pressure of a tower kettle was 1.00 MPaA, and the temperature of a tower kettle was −52° C.

Embodiment 4

A method for graded utilization of fluorine and silicon in a phosphate ore specifically includes the following operations.

(1) acidification: the phosphate ore reacted with the phosphoric acid according to a reaction of producing triple superphosphate, and superheated steam of not less than 140° C. was introduced into a slurry for steam stripping. The fluorine-containing secondary steam was sent to step (2) for absorption together with the tail gas produced in acidification.

(2) absorption: a fluoro silicic acid solution with a mass fraction of 20% was obtained by absorbing the tail gas produced during the acidification through a three-stage countercurrent absorption at 45° C., and a fluorine recovery rate was 88%. The absorbed tail gas was sent to react with a sodium carbonate solution to obtain a small amount of sodium fluorosilicate. More descriptions regarding the three-stage countercurrent absorption may be found in previous related descriptions.

(3) osmotic thickening: a forward osmosis was adopted to concentrate the fluoro silicic acid with the mass fraction of 20% to the fluoro silicic acid with the mass fraction of 50% by countercurrent and osmosis using a saturated monoammonium phosphate solution as a driving liquid, and the produced dilute ammonium phosphate was returned to a phosphate fertilizer production line. More descriptions regarding the forward osmosis may be found in the previous related descriptions.

(4) extraction and filtration: a cationic extractant (80% volume of P204+20% volume of kerosene) accounting for 1/200 of the volume of the fluoro silicic acid solution was added to the fluoro silicic acid solution of 50%, the mixture fully contacted with impurity-containing $SiF_4$ produced by the distillation and gaseous desorption in a microemulsion reactor, and then, after standing clarification for 20 minutes, the fluoro silicic acid solution was concentrated to the fluoro silicic acid solution with the mass fraction of 55%, while producing silica to be filtered.

(5) extraction: 1 part by volume of fluoro silicic acid solution of 55% was extracted by 6 parts by volume of cationic extractant (80% volume of P204+20% volume of kerosene), and then 1 part by volume of the raffinate was extracted by 6 parts by volume of anionic extractant (80% volume of N-235+20% volume of heptane) to obtain the preliminary purified fluoro silicic acid solution. The loaded phase after extraction of the cationic extract phase was recycled after water washing and regeneration with the dilute sulfuric acid of 40%, a volume ratio of the loaded phase after the extraction of the cationic extract phase to water was 40:1, and a volume ratio of the loaded phase after the water washing to the dilute sulfuric acid of 40% was 40:1. The loaded phase after extraction of anionic extract phase was recycled after water washing and regeneration with ammonia of 25%, the volume ratio of the loaded phase after extraction of anionic extract phase to water was 40:1, and the volume ratio of the loaded phase after washing to ammonia of 25% is 40:1.

(6) liquid adsorption: a refined fluoro silicic acid solution was obtained by deeply removing the impurity of the preliminary purified fluoro silicic acid solution through activated carbon, cation resin, and anion resin, sequentially. When regeneration, the activated carbon, cation resin, and anion resin were rinsed with desalted water first, and the wash water was returned to the absorption process of the acidification of tail gas. Then the activated carbon was washed using sodium hydroxide solution with a mass fraction of 5%, the anion resin was washed using ammonia with a mass fraction of 25%, and then the activated carbon and anion resin was rinsed with desalted water, and produced wastewater was sent to a phosphate fertilizer production line for absorption of the tail gas. The cation resin was washed using a sulfuric acid solution with a mass fraction of 15%, then rinsed with the desalted water, and the produced wastewater was sent to the acidification process. The desorption temperature was set to 80° C.

(7) dewatering: a sulfuric acid of 98.3% and the refined fluoro silicic acid solution completed dehydration in a microemulsion reactor through a two-stage countercurrent contact to obtain crude $SiF_4$ and the sulfuric acid solution containing hydrogen fluoride. The sulfuric acid solution containing hydrogen fluoride was defluorinated by steam stripping and turned into waste sulfuric acid, which was sent to acidification of phosphate ore. The gas phase of the steam stripping was distilled to obtain anhydrous hydrogen fluoride.

(8) decontamination by gaseous adsorption: the crude $SiF_4$ was desorbed by activated carbon, molecular sieve, and porous alumina oxide surface-modified by an organic amine sequentially to obtain refined $SiF_4$.

The activated carbon and the molecular sieve were regenerated by desorption of absolute dry nitrogen, the activated carbon and the molecular sieve first were desorbed at a temperature of 150° C. and a pressure of 0.3 MPaA, and the desorbed gas was sent to the step (4) for concentrating the concentrated solution; then the activated carbon and the molecular sieve were desorbed at a temperature of 250° C. and a pressure of 0.5 MPaA, and the desorbed gas was sent to fertilizer production. The activated carbon, the molecular sieve, and the modified adsorbent were regenerated by desorption of the absolute dry nitrogen gas and a mixture gas of ammonia-containing nitrogen with a volume fraction of ammonia of 10%. The desorption temperature was 110° C. and the desorption pressure was 80 KPaA; the desorbed gas formed by the absolute dry nitrogen gas was sent to the concentrated solution of the step (4); and the desorbed gas formed by the mixture gas of the ammonia-containing nitrogen gas was sent to a tail wash section of the fertilizer production.

(9) low-temperature distillation: the $SiF_4$ with a high purity of not less than 99.999% was obtained by performing two stages distillation on the refined $SiF_4$. The impurity-containing $SiF_4$ was sent to the operation of concentration and filtration for the fluoro silicic acid solution.

The first-stage distillation was to remove the impurities with the low boiling point, a pressure at a top of a tower was 1.15 MPaA and a temperature at the top of the tower was −51° C., a pressure of a tower kettle was within a range of 1.0 MPaA to 1.2 MPaA, and a temperature of a tower kettle was −47° C. The second-stage distillation was to remove the impurities with the high boiling point, the pressure at a top of a tower was 1.05 MPaA, the temperature at the top of the tower was −55° C., the pressure of a tower kettle was 1.10 MPaA, the temperature of a tower kettle was −50° C.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

At the same time, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for a graded utilization of fluorine and silicon resources in a phosphate ore, comprising:
   Step (1), acidification: mixing sulfuric acid or phosphoric acid with the phosphate ore for reacting to produce dilute phosphoric acid or phosphate fertilizer while generating tail gas including fluorine and silicon;
   Step (2), absorption: obtaining an acidic solution including fluorine and silicon by absorbing the tail gas with water;
   Step (3), osmosis thickening: obtaining a dilute solution by performing an osmosis operation on the acidic solution using a driving solution, wherein the driving solution absorbs part of solvent of the acidic solution to obtain the dilute solution; and the acidic solution increases in concentration to obtain a concentrated solution; and the osmosis operation is a forward osmosis, wherein the driving solution is a phosphate solution or a phosphoric acid solution, and the dilute solution includes a dilute phosphate solution or a dilute phosphoric acid solution;

Step (4), concentration and filtration: performing a concentration operation by passing silicon fluoride gas into the concentrated solution to continuously increase concentration of the concentrated solution; and filtering and separating the concentrated solution to obtain silicon dioxide ($SiO_2$), a fluorine-containing solution, and waste gas;

Step (5), extraction: obtaining a loaded phase and a raffinate by adding an extract phase to the fluorine-containing solution, mixing and extracting thoroughly, and separating phases;

Step (6), liquid adsorption: obtaining a refined solution by adsorbing and removing impurities from the raffinate;

Step (7), dehydration: obtaining crude silicon tetrafluoride ($SiF_4$) and an HF-sulfuric acid ($H_2SO_4$) solution by adding a dehydrant to the refined solution and mixing thoroughly, and producing anhydrous hydrogen fluoride with a purity of not less than 99% and waste sulfuric acid as a by-product by performing steam stripping and distillation on the separate $HF—H_2SO_4$ solution;

Step (8), decontamination: obtaining decontamination gas by adsorbing impurities in the crude $SiF_4$ by gaseous adsorption; and Step (9), low-temperature distillation: obtaining impurity gas, and $SiF_4$ with a purity of not less than 99% by performing a low-temperature distillation on the decontamination gas to remove impurities with low and high boiling points.

2. The method for graded utilization of fluorine and silicon resources in a phosphate ore of claim 1, wherein the dilute phosphoric acid solution obtained in the step (3), the waste sulfuric acid obtained in the step (7) are sent to the step (1) to be mixed with the phosphate ore; the waste gas obtained in the step (4) is sent to the step (2) to be absorbed with the tail gas; and the impurity gas obtained in the step (9) as $SiF_4$ is sent to the concentrated solution in the step (4).

3. The method for graded utilization of fluorine and silicon resources in a phosphate ore of claim 1, wherein in the step (1), the phosphate ore reacts with the sulfuric acid according to a reaction of producing calcium superphosphate, and superheated steam of fluoro silicic acid not less than 140° C. is introduced into a slurry for steam stripping fluoro silicic acid to obtain product calcium superphosphate and fluorine-containing secondary steam, wherein the fluorine-containing secondary steam is sent to the step (2) for absorption together with the tail gas produced in the step (1).

4. The method for graded utilization of fluorine and silicon resources in a phosphate ore of claim 1, wherein the sulfuric acid or the phosphoric acid in step (1) is mixed with the phosphate ore to obtain the dilute phosphoric acid, and the dilute phosphoric acid is concentrated to obtain fluorine-containing secondary steam and fertilizer phosphoric acid with a mass fraction of $P_2O_5$ not less than 54%; and the fluorine-containing secondary steam is sent to the step (2) for absorption together with the tail gas produced in the step (1).

5. The method for graded utilization of fluorine and silicon resources in a phosphate ore of claim 1, wherein an external cooling forced circulation three-stage countercurrent vacuum absorption is adopted in the step (2), and each stage of absorption adopts a parallel contact form of spraying in an upper section and filling in a lower section, wherein a droplet particle size of spray is within a range of 100 μm to 300 μm, and a temperature of each stage of a circulation liquid is not higher than 60° C.

6. The method for graded utilization of fluorine and silicon resources in a phosphate ore of claim 1, wherein the tail gas not absorbed in the step (2) is sent for deep absorption; wherein an absorbent configured for the deep absorption includes $Na_2CO_3$, $NaHCO_3$ or KOH solution, and a temperature of the deep absorption is not higher than 40° C.

7. The method for graded utilization of fluorine and silicon resources in a phosphate ore of claim 1, wherein the concentration operation in the step (4) is performed in a microemulsion reactor.

8. The method for graded utilization of fluorine and silicon resources in a phosphate ore of claim 1, wherein in the concentration operation of the step (4), the concentrated solution is first thoroughly mixed with a surfactant and then mixed with $SiF_4$; and a volume ratio of the surfactant to the concentrated solution is within a range of 1:200 to 1:50; and the surfactant is the extract phase for cationic extraction.

9. The method for graded utilization of fluorine and silicon resources in a phosphate ore of claim 1, wherein the extract phase in the step (5) is composed of an extractant and a diluent, a volume fraction of the extractant is not more than 80%, and the diluent is a mixture of one or more of kerosene, isopropyl ether, $C_6$-$C_{14}$ hydrocarbons.

10. The method for graded utilization of fluorine and silicon resources in a phosphate ore of claim 9, wherein the extraction of step (5) includes a cationic extraction and an anionic extraction, and the loaded phase after both the cationic extraction and the anionic extraction is washed and regenerated for recycling.

11. The method for graded utilization of fluorine and silicon resources in a phosphate ore of claim 10, wherein a volume ratio of the extract phase for cationic extraction to the fluorine-containing solution is within a range of 0.5:1 to 6:1, and the extractant of a cationic extract phase is a mixture of one or more of organic phosphines, phospholipids, carboxylic acids, and sulfonic acid organic solvents; a volume ratio of the extract phase for anionic extraction to the fluorine-containing solution is within a range of 0.5:1 to 6:1, and the extractant of a anionic extract phase is an organic amine extractant.

12. The method for graded utilization of fluorine and silicon resources in a phosphate ore of claim 11, wherein
the loaded phase after extraction of the cationic extract phase is recycled after water washing and regeneration with the dilute sulfuric acid of 5% to 40%, a volume ratio of the loaded phase after the extraction of the cationic extract phase to water is within a range of 10:1 to 40:1, and a volume ratio of the loaded phase after the water washing to the dilute sulfuric acid ratio is within a range of 10:1 to 40:1;
the loaded phase after extraction of anionic extract phase is recycled after the water washing and regeneration with ammonia of ammonia of 2% to 25%, a volume ratio of loaded phase after the extraction of the anionic extract phase to water is within a range of 10:1 to 40:1, and a volume ratio of the loaded phase after the water washing to the ammonia of 2% to 25% is within a range of 10:1 to 40:1; and
a wash residue produced after two water washing is returned to the step (2) for absorbing the tail gas, and a regeneration waste liquid produced after two regenerations is configured for the acidification of the phosphate ore or fertilizer production.

13. The method for graded utilization of fluorine and silicon resources in a phosphate ore of claim 1, wherein the liquid adsorption in the step (6) includes an activated carbon adsorption, a cation adsorption, and an anion adsorption, the activated carbon, a cation adsorbent, and a anion adsorbent are reused after being desorbed and regenerated when adsorption saturation; wherein
the desorption regeneration of the activated carbon is that the activated carbon is first desorbed with water, then desorbed using a sodium hydroxide solution of a mass fraction of 5% to 10%;
the desorption regeneration of the cationic adsorbent is that the cationic adsorbent is first desorbed with the water, then desorbed using a sulfuric acid solution of a mass fraction of 5% to 20%; and
the desorption regeneration of the anion adsorbent is that the anion adsorbent is first desorbed with the water, then desorbed using an ammonia of a mass fraction of 5% to 25%; wherein a desorption temperature is within a range of 60° C. to 80° C.; a desorption solution formed by the desorption of the water is returned to the step (2) to adsorb the tail gas; a desorption solution formed by the desorption of the sodium hydroxide solution desorption and the ammonia water is configured for the fertilizer production, and the desorption solution formed by the desorption of the sulfuric acid solution is configured for the acidification of the phosphate ore.

14. The method for graded utilization of fluorine and silicon resources in a phosphate ore of claim 1, wherein the refined solution in the step (7) is dehydrated with a dehydrant in the microemulsion reactor by two-stage countercurrent contact; the dehydrant in the step (7) is one or more of sulfur trioxide, fuming sulfuric acid, and concentrated sulfuric acid with a mass fraction greater than 93%.

15. The method for graded utilization of fluorine and silicon resources in a phosphate ore of claim 1, wherein the gaseous adsorption in the step (8) includes an activated carbon adsorption, a molecular sieve adsorption, and a modified adsorbent adsorption, and the activated carbon, molecular sieve, and modified adsorbent are reused after being adsorbed and regenerated when adsorption saturation.

16. The method for graded utilization of fluorine and silicon resources in a phosphate ore of claim 15, wherein the activated carbon and the molecular sieve are regenerated by desorption of absolute dry nitrogen, the activated carbon and the molecular sieve first are desorbed at a temperature within a range of 100° C. to 150° C. and a pressure within a range of 0.2 MPaA to 0.3 MPaA, and desorption gas is sent to the step (4) for concentrating the concentrated solution; and the activated carbon and the molecular sieve are then desorbed at a temperature within a range of 200° C. to 250° C. and a pressure within a range of 0.3 MPaA to 0.5 MPaA, and the desorbed gas is sent for fertilizer production.

17. The method for graded utilization of fluorine and silicon resources in a phosphate ore of claim 16, wherein the activated carbon, the molecular sieve, and the modified adsorbent are regenerated by desorption of the absolute dry nitrogen gas and a mixture gas of ammonia-containing nitrogen with a volume fraction of ammonia within a range of 2% to 10%; wherein the desorption temperature is greater than 100° C. and the desorption pressure is not greater than 80 KPaA; the desorbed gas formed by the absolute dry nitrogen gas is sent to the concentrated solution of the step (4); and the desorbed gas formed by the mixture gas of the ammonia-containing nitrogen gas is sent to a tail wash section of the fertilizer production.

18. The method for graded utilization of fluorine and silicon resources in a phosphate ore of claim 17, wherein the modified adsorbent is porous alumina oxide surface-modified by an organic amine, silicon dioxide surface-modified by the organic amine, or a porous high-molecular polymer surface-modified by the organic amine.

19. The method for graded utilization of fluorine and silicon resources in a phosphate ore of claim 18, wherein the low-temperature distillation in the step (9) includes a first-stage distillation and a second-stage distillation; the first-stage distillation is to remove the impurities with the low boiling point, a pressure at a top of a tower is within a range of 0.95 MPaA to 1.15 MPaA, a temperature at the top of the tower is within a range of −56° C. to −51° C., a pressure of a tower kettle is within a range of 1.0 MPaA to 1.2 MPaA, a temperature of the tower kettle is within a range of −51° C. to −47° C.; and the second-stage distillation is to remove the impurities with the high boiling point, the pressure at the top of the tower is within a range of 0.85 MPaA to 1.05 MPaA, the temperature at the top of the tower is within a range of 60° C. to −55° C., the pressure of the tower kettle is within a range of 0.9 MPaA to 1.1 MPaA, the temperature of the tower kettle is within a range of −55° C. to −50° C.

\* \* \* \* \*